United States Patent [19]

Wilson

[11] 4,308,597

[45] Dec. 29, 1981

[54] SELSMIC FIELD RECORDING TECHNIQUE

[75] Inventor: Harold A. Wilson, Ponca City, Okla.

[73] Assignee: Conoco Inc., Ponca City, Okla.

[21] Appl. No.: 105,314

[22] Filed: Dec. 19, 1979

[51] Int. Cl.³ .......................... G01V 1/20; G01V 1/28
[52] U.S. Cl. ...................................... 367/58; 367/43; 367/56; 367/59
[58] Field of Search ...................... 367/43, 48, 56, 58, 367/59

[56] References Cited

U.S. PATENT DOCUMENTS

| | | | |
|---|---|---|---|
| 1,799,398 | 4/1931 | Taylor | 367/56 |
| 1,959,004 | 5/1934 | Owen | 367/48 |
| 2,087,702 | 7/1937 | Peters | 367/58 |
| 2,810,444 | 10/1957 | Dyk et al. | 367/58 |

Primary Examiner—Howard A. Birmiel
Attorney, Agent, or Firm—William J. Miller

[57] ABSTRACT

A method for removing an undesired surface wave from a reflected wave in a method for seismic exploration is accomplished by placing first and second detector arrays at a location on the surface of the earth in the direction of movement of the surface wave. The array has a length less than the length of the shortest wave length of the interfering wave to be eliminated. Signals from both arrays are recorded and processed by first adding the received signals to form a first output, subtracting added signals to form a second output, shifting one of the output signals by 90°, adjusting its amplitude and subtracting the phase shifted and adjust signal from the remaining signal thereby removing the surface wave.

7 Claims, 2 Drawing Figures

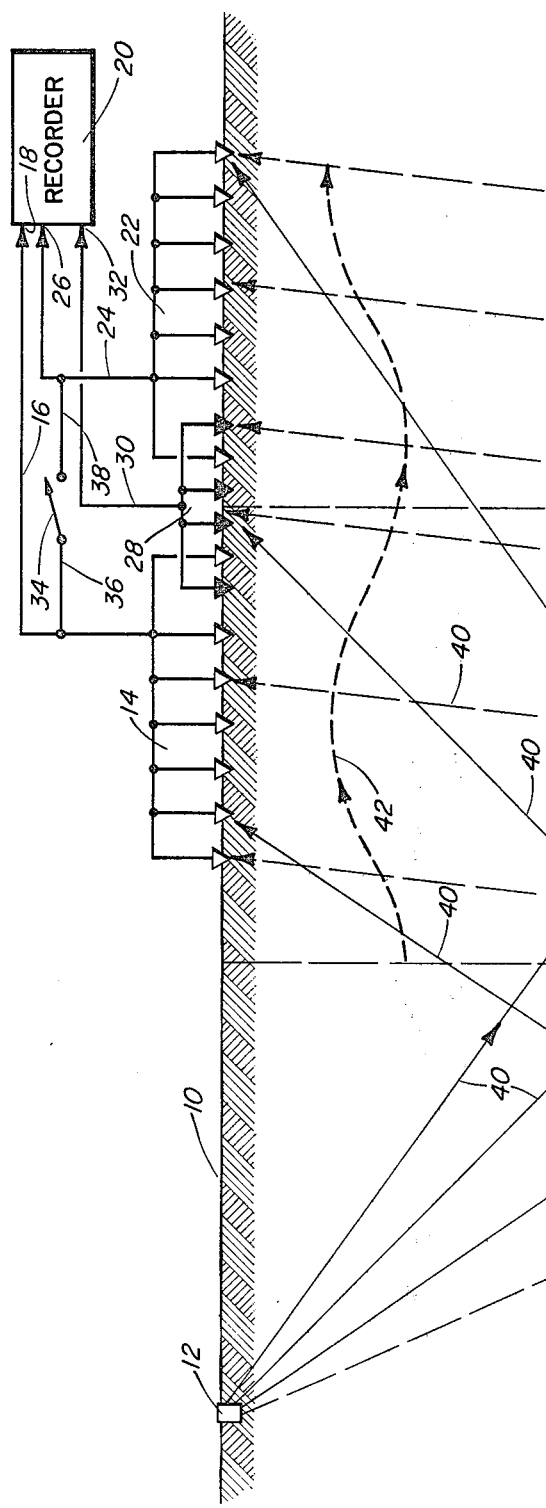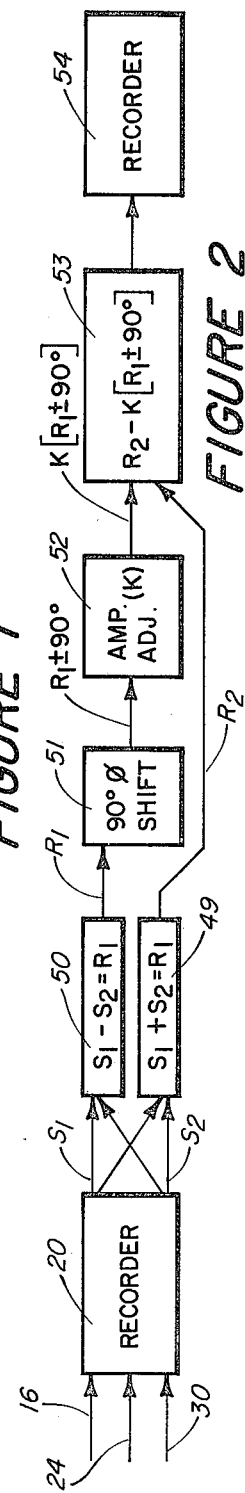

SEISMIC FIELD RECORDING TECHNIQUE

BRIEF DESCRIPTION OF THE PRIOR ART

Placement of detector arrays to eliminate an undesired seismic noise is old. When the noise constitutes a surface wave, detectors arranged on the surface of the earth in a particular manner are illustrated by the U.S. patents to Bayhi, U.S. Pat. No. 2,747,172; Clay, Jr., U.S. Pat. No. 2,906,363; Wolf, U.S. Pat. No. 3,137,363; and Judson, U.S. Pat. No. 3,597,727. In each of these patents, the detector arrays are arranged with a particular spacing (see patent to Clay, Jr.) or arranged with a particular spread length (see patent to Wolf). Other arrangements, such as circle or star placement of detector arrays, were used to reduce the effect of the surface wave and enhance the reflected wave.

BRIEF DESCRIPTION OF THE INVENTION

This invention offers a new concept for dealing with the undesirable or interfering surface wave by placing arrays of seismic detectors on the surface of the earth which are sensitive to both the surface wave and the reflected wave and processing the recorded data to eliminate the surface wave.

In the preferred embodiment, first and second detector arrays are placed at a location on the surface of the earth in line with the direction of movement of the surface wave. The array has a length less than the length of the shortest wavelength of the interfering wave to be eliminated. Both arrays are recorded and then processed to obtain a first recorded trace resulting from the addition of the recorded traces and a second recorded trace representing the difference between the received and recorded traces. One of the resulting traces is then shifted in phase by 90° and subtracted from the remaining resultant trace and the difference trace recorded. The final difference trace will have the interfering surface wave eliminated.

In another embodiment, the first and second detector array each receives the surface wave and the reflected wave and a third detector array placed as a point receptor beside the first and second array receives the surface wave and the reflected wave. The first and second detector arrays are subtracted to obtain the surface wave and this result is subtracted (with a 90° phase shift) from the point receptor recording, resulting in a recording containing only the reflected wave.

In an alternate embodiment the first and second detector array outputs are subtracted in the field by connecting the leads from the detectors in the first array to the leads in the second array with a polarity which is 180° out of phase with each other.

BRIEF DESCRIPTION OF THE DRAWINGS

FIG. 1 is a partial cross-section of the earth illustrating the field layout to accomplish the invention; and, FIG. 2 is the computer steps to process the recordings to eliminate the surface wave and output the reflected wave.

DETAILED DESCRIPTION OF THE INVENTION

Referring to all of the figures, the surface 10 of the earth has a seismic signal generating source 12 at one location and a first detector array 14 at a second location which is coupled through a wire means 16 to an input 18 of a recorder 20. A second detector array 22 located on the surface of earth 10 is coupled through a wire means 24 to a second input 26 of recorder 20. The spacing of the individual detectors is in the usual manner and can be from a few inches to several hundred feet. The spacing is principally determined by the surface wave or waves desired to be eliminated. It is preferable that the spacing be such that the array has a dimension which is less that the shortest wave length of the interfering wave which is to be eliminated. For some surface waves this would mean that the individual detectors could be as close as six inches apart. The detectors are oriented also in the usual manner which is normally along a line in the direction of the progression of the survey. The usual areal arrays can be incorporated. In an embodiment to be discussed, a third array 28 is positioned beside detector arrays 14 and 22. Each detector (or nest of detectors) however, is positioned close together so that the array will effectively operate as a point receptor. Detector array 28 is coupled through a wire means 30 to an input 32 of recorder 20. A switch 34 is connected through wires 36 and 38 to wires 16 and 24, respectively. The switch 34 and wires 36 and 38 are illustrated solely to explain a further embodiment of the invention.

OPERATION

The invention operates in the following manner. A seismic signal is generated by source 12 which generates energy into the earth 10. Some of the energy travels deep, for example, long rays 40 while some of the energy travels along the surface as illustrated by dashed line 42. During normal seismic surveys, the information along rays 40 reflects from a subterranean stratum 44 along with reflections from deeper subterranean stratum (not shown) and is received by detector arrays 14, 22 and 28. In addition to the reflected wave, a surface wave 42 travels from source 12 to detector arrays 14, 22 and 28. The surface wave 42, unless properly canceled (as in the prior art) or eliminated, can mask the weak signals being received from great depths.

The individual detector arrays 14 and 22, for example, should be connected to recorder 20 with a known polarization in order to ease the processing of data at a later time. As previously mentioned, detector arrays 14 and 22 are spaced in accordance with the usual procedure for the laying out of detector arrays. However, the total length of the arrays should be less than the length of the shortest interference wave to be considered. This means that where the wave length to be considered is 100 feet the total length of the array will occupy space less than 100 feet in length. When seismic source 12 generates a signal into the earth along rays 40 along with a surface wave 42, energy is received in detector arrays 14 and 22 which combine both the energies from rays 40 and the surface wave 42. This energy is received and transmitted through wires 16 and 24 to recorder 20. Switch 34 is not engaged during the recording procedure. Both polarities must be determined or known after the signal has been recorded since the signals will subsequently be processed by addition, and subtraction of one from the other.

The processing as illustrated in FIG. 2 is accomplished in the following sequence. Recorded signals S1 and S2 received from detector arrays 14 and 22 are subtracted in circuit 50 by shifting the phase of one recording by 180° to obtain a signal R1. The recorded signals from the detector arrays 14 and 22, S1 and S2 are also added in phase in circuit 49 to obtain a resultant signal R2. One of the signals, for example, R1 is shifted by ±90° in circuit 51 and its amplitude is adjusted by a constant "K" in circuit 52 so that the amplitude will correspond with the amplitude of R2. The shifted and amplitude corrected signal K(R1±90°) is then algebraically added in circuit 53 to R2 which results in the signal R1 being subtracted from the signal R2. The finally processed signal is recorded in recorder 54. Since the subtracting of the signal from the recording of detector arrays 14 and 22 resulted in the cancellation of the reflected signal (the reflected signal would be received simultaneously and in phase in both arrays), R1 contains substantially only the surface wave signal. The subtraction of R1 then from R2 when properly amplitude adjusted will eliminate the surface wave from R2 resulting in the reflected wave only as an output which will subsequently be recorded on recorder 54.

Another way to obtain the reflected wave and the surface wave is to use a point receptor 28 (see FIG. 1). Thus the signal from the point receptor will be substantially the same as the signal from 14 and 22 when added to form R2. The processing of signal 28 will be the same as that described for the processing of the data utilizing R2. If some processing is desired to be eliminated, detector arrays 14 and 22 can be subtracted in the field. This is accomplished by opposite polarizing arrays 14 and 22 and then connecting them together by closing switch 34 which will connect wire 16 through wires 36 and 38 to wire 24. Signals then received on arrays 14 and 22 will be automatically subtracted by virtue of the opposite polarities of the two detector arrays. It is, of course, obvious that only one of the wires 16 or 24 need be connected to recorder 20. The last described embodiment, however, can effect the output since a parallel or series connected out of phase array will damp the arrays thereby effecting the resulting signal.

It is obvious that modifications and changes can be made to the application and still be within the spirit and scope of the invention as disclosed in the specification and appended claims.

What I claim is:

1. A method of seismic exploration comprising generating a seismic signal into the earth at a first location and wherein a reflected wave and a surface wave arrive at a second location on the surface of the earth comprising: placing a first and second array on the surface of the earth at said location, said arrays having a length less than the length of the shortest wavelength of said surface wave desired to be eliminated; receiving signals from each of said first and second arrays corresponding to the surface waves and reflected waves received at said arrays; subtracting one of said array signals from said other array signals and recording said difference as a signal R1; adding both of said array signals and recording said added signals as a signal R2; shifting the phase of one of said signals R1 or R2 by 90° and adjusting the amplitude of said shifted signal to correspond to the amplitude of the surface wave present in said remaining signal; and subtracting said phase shifted and adjusted signal from said remaining signal and recording the result whereby the undesired surface wave will be eliminated.

2. A method of seismic exploration comprising:
   a. generating a seismic signal into the earth wherein a reflected wave and a surface wave is formed;
   b. placing a first detector array on the surface of the earth in an arrangement to function as a point receptor which is receiving said reflected wave Rp and surface wave Sp and generating a voltage output Rp+Sp;
   c. placing a second detector array adapted to receive said surface wave S and said reflected wave R on the surface of the earth, said second detector array having a first portion on one side of said first detector array and in the side closest to said generated seismic signal, and a second portion on the opposite side of said first detector array, said first portion generating a signal S1+R1 and said second portion generating a signal S2+R1;
   d. algebraically subtracting said signals S1+R1 and S2+R1 to form an output signal Sr;
   e. shifting the phase of said signal Sr by 90°;
   f. adjusting the amplitude of said phase shifted signal so that the amplitude is substantially equal to the value Sp in said first detector signal Sp+Rp; and,
   g. subtracting said resultant signal Sr from said first detector signal Sp+Rp to form a signal Rp which represents only the reflected signal and wherein said surface wave has been eliminated.

3. A method as described in claim 2 wherein said signals S1+R1, S2+R1, and Sp+Rp are recorded on a recording medium and wherein said signals are read from said recording medium and like polarized signals S1+R1 and S2+R1 are then algebraically subtracted.

4. A method of seismic exploration comprising:
   a. generating a seismic signal into the earth at a first location which generates a surface wave S and reflected wave R;
   b. placing a first detector array in contact with the earth at a second location and spaced from said first location placed to function as a point receptor;
   c. placing a second detector array adapted to receive said surface wave S and said reflected wave R on the surface of the earth on an area along a line extending from said generated seismic signal, said second detector array having a first portion on one side of said first detector array and in the side closest to said generated seismic signal, and a second portion on the opposite side of said first detector array, said first portion receiving a signal S1+R1 and said second portion receiving a signal S2+R1;
   d. algebraically subtracting said signals S1+R1 and S2+R1 to form an output resultant signal Sr;
   e. recording on a recording medium said resultant reflected signals from said first and said second detector arrays; and
   f. reading from said recording medium said signal from said first detector array and said signals from said first and second portion of said second detector array, and algebraically subtracting said first portion signal and said second portion signal when identically polarized from said signal from said first detector array and recording the result.

5. A method of seismic exploration where a seismic signal is generated at a first location into the earth and wherein direct and reflected waves are created at a second location on the surface of the earth, said method comprising:
   a. placing a first detector array means in contact with the surface of the earth at said second location to function as a point receptor;
   b. placing a second detector array means in contact with the surface of the earth at said second location, said second detector array means distributed on each side of said first detector array means and in line with the direction of travel of said surface wave from said first location to said second location;

c. phasing said second detector array means so that the detectors on the side closest to said first location have a phase opposite the detectors on the opposite side of said first detector array;

d. generating a seismic signal into the earth;

e. receiving said direct wave and reflected seismic signals at said second location;

f. algebraically adding said received seismic signal on each side of said second detector array and recording said added signals;

g. recording said signals from said first detector array in time synchronism with the recording of the signal from said second detector array;

h. shifting the phase of said signal by $\pm 90°$, adjusting its amplitude to substantially equal the amplitude of the signal from said first and second detector arrays; and i. subtracting the adjusted signals from said first and second detector arrays and recording the resultant signal.

6. A method of seismic exploration comprising:

a. generating a seismic signal into the earth at a first location;

b. placing a first detector array in contact with the earth at a second location and spaced from said first location, said array placed to function as a point receptor;

c. placing a second detector array in contact with the earth, said second detector array having first and second portions distributed on each side respectively of said first detector array and oriented in line with said first and second location;

d. phasing said first portion 180° out of phase with said second portion while connecting said first and second portions to additively combine signals received by said first and second portions of said second detector array;

e. receiving said generated seismic signal at said first and second detector arrays at said second location after transmission into the earth as a reflected wave and across the earth as a direct wave; and f. recording said signals received by said first and second detector arrays individually and in time synchronism.

7. The steps of the method as set out in claim 6 and additionally including:

a. subtracting the recorded signal from said first detector array which includes the direct wave and the reflected wave with the signal from said second detector array which includes the direct wave; and b. recording said difference signal which contains substantially said reflected wave.

* * * * *